Patented Nov. 5, 1929

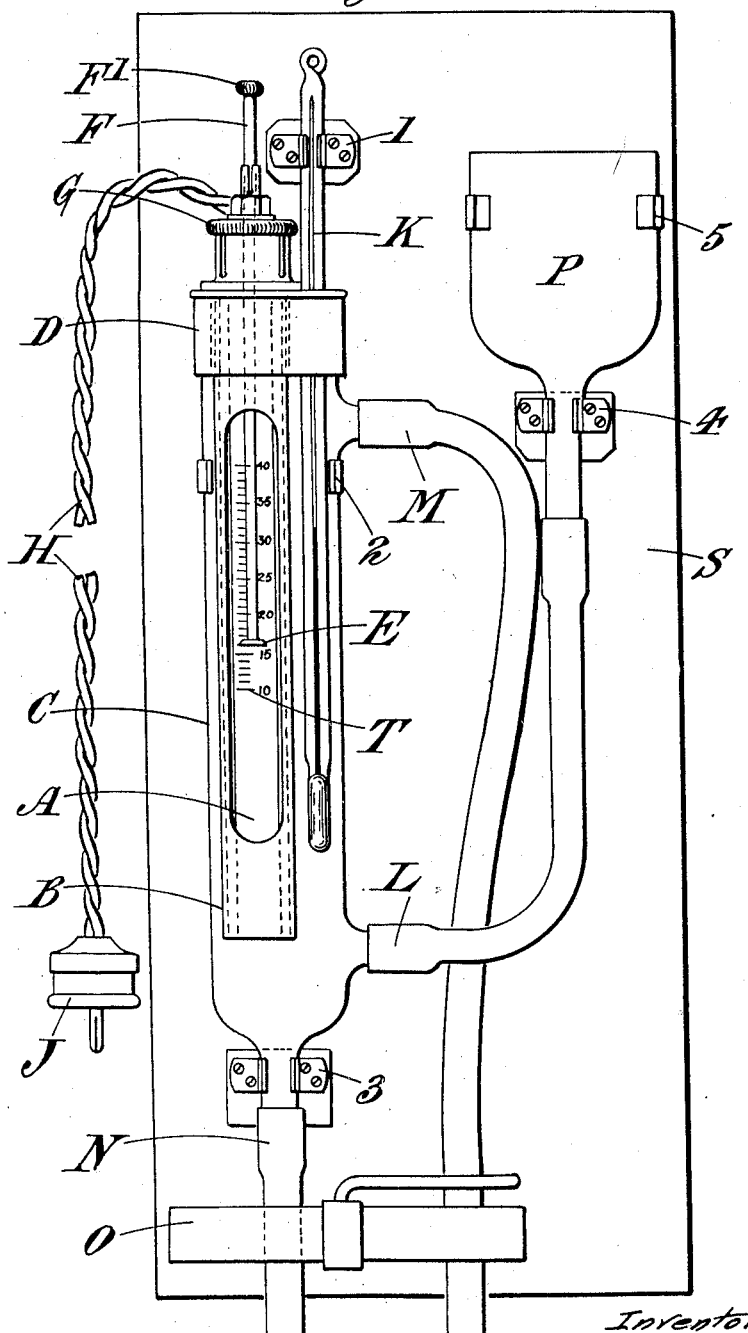

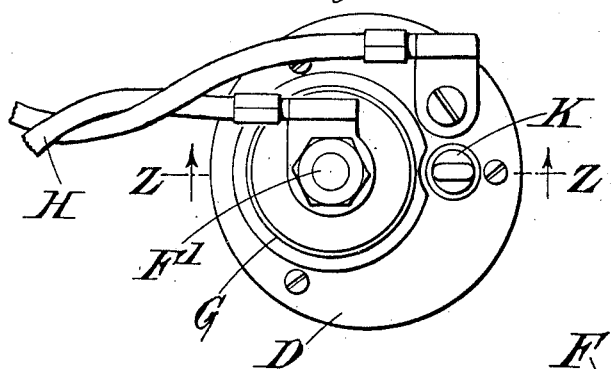
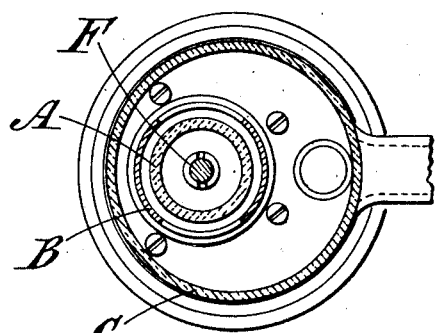
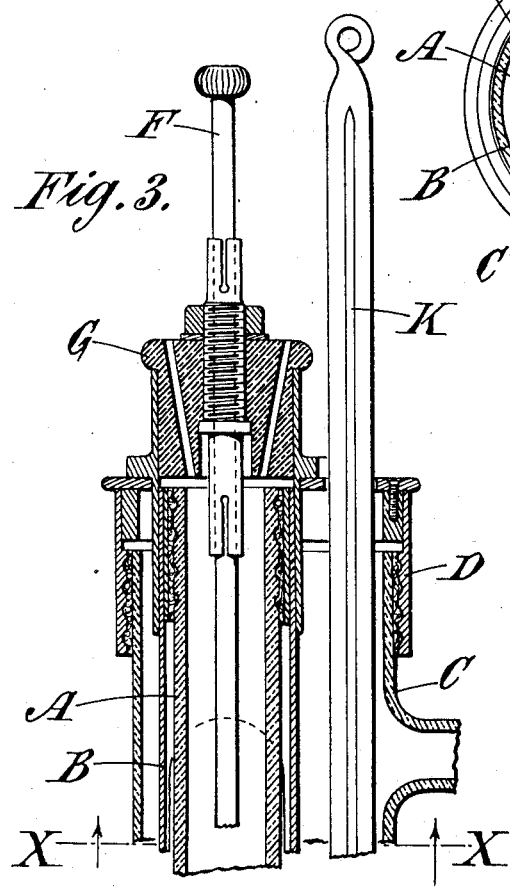

1,734,342

UNITED STATES PATENT OFFICE

CHARLES EDWIN PERRY, OF LONDON, ENGLAND, ASSIGNOR TO EVERSHED & VIGNOLES, LIMITED, OF LONDON, ENGLAND

APPARATUS FOR THE DETECTION AND ESTIMATION OF IMPURITIES AND DISSOLVED MATTER IN WATER AND OTHER FLUIDS

Application filed April 8, 1927, Serial No. 181,928, and in Great Britain June 18, 1926.

This invention relates to improvements in apparatus for the detection and estimation of impurities and dissolved matter in water and other fluids of the type described and claimed in the specifications of British Letters Patent, Nos. 23706/07 and 12735/14.

The present invention has for one of its objects the provision of means whereby the necessary correction for temperature of the fluid under test can be effected by simpler, cheaper and more robust devices than has been possible heretofore; a further object being a construction of apparatus for the purpose specified the accuracy of the calibration of which will not be affected by dismantling and reassembling and which therefore can be more readily cleaned than hitherto has been possible and also can be repaired by replacement of damaged parts by stock parts without re-calibration being necessary.

The method of testing by apparatus as described in the specification of British Letters Patent No. 23706/07 has the disadvantage that a correction has to be made for the temperature of the fluid under test by means of a calculation.

In the specification of British Letters Patent No. 12735/14, this difficulty was overcome by varying the transverse sectional area of the path through the liquid between the electrodes in accordance with the temperature but the apparatus was comparatively costly and the calibration was very liable to be disturbed.

According to the present invention the conductance of the column of fluid under test is adjusted for temperature correction by varying the electrical length of said column a temperature scale being provided to enable the length of said column to be readily adjusted to give the correction required for any given temperature.

The invention may be put into effect in many ways and the construction described hereinafter must be considered to be by way of example only.

The invention consists, firstly, in arranging the electrodes in the container so that they can be displaced relatively to one another so as to vary the length of the electrical path through the liquid to give the correction required for any given temperature; secondly in subdividing the liquid container into two zones communicating with each other at the lower part by a dividing wall of electrically insulating material and arranging one electrode in one zone and the other electrode in the other zone in such a way as to enable the length of electrical path between the two electrodes to be varied and thirdly in the construction and arrangement of the electrodes, means of adjusting same, and a scale relative thereto in standard form so that the thermometer and the electrodes can be removed from the container for cleaning and renewal purposes without difficulty or the necessity for any special calibrating functions.

In the drawings:—

Fig. 1 is a front view of the device.

Fig 2 is a plan view of the same.

Fig. 3 is a sectional view of the upper part of the device showing the manner in which the parts are associated with one another, and Fig. 4 is a sectional view taken on the line X—X of Fig. 3.

A glass tube A open at each end is enclosed within a metallic sheath B, both tube and sheath being supported within an outer glass container C by means of a cap D of metal or other suitable material in such a way that the lower ends of the tube A and sheath B are flush with one another. The metallic sheath B forms one electrode, the other electrode E being of disc form and disposed within the glass tube A, the electrode E being carried by a rod F slidably mounted on the cap D but electrically insulated therefrom by means of a bush G of insulating material. A knob $F^1$ suitable for finger operation is provided at the top of the rod F.

Both the external tubular electrode B and the internal disc electrode E and rod F may be made of base metal and suitably plated with gold, platinum or the like to prevent any contamination of the liquid under test.

To enable the position of the disc electrode E within the glass tube A to be easily ascertained a portion of the metallic sheath B is cut away as shown to expose the glass tube A and to enable the electrode E to be positioned relative to a temperature scale T engraved on the exposed part of glass tube A.

The electrodes B and E are provided with means such as a flexible twin cable H and plug J adapted to enable them to be included in electrical circuit with a source of electrical energy and a conductance meter and provision is made for a thermometer K of ordinary form to be inserted through an aperture in the cap so that it is disposed parallel with and in close proximity to the electrode unit.

The glass container is provided with the usual necessary inlets and outlets L and N for filling and draining and also for overflow M.

O is a spring clip for closing the drain tube N.

P is a filling funnel.

1, 2, 3, 4 and 5 are spring clips for mechanically mounting the various parts of the apparatus on a suitable base board S. In using the apparatus, the temperature of the liquid is read from the thermometer and the electrode E is then positioned relative to the mark on the scale which corresponds with the thermometer reading with the result that so long as the position of the electrode corresponds with the temperature of the liquid under test the conductance of the liquid path is the same (for a given solution) whatever the temperature within the limits of the apparatus. After removal of the thermometer from the container, the cap and its associated parts can be removed as a whole for dissembling cleaning and reassembling without affecting the calibration, the only precaution to be observed being that the tube A is correctly positioned with regard to the sheath electrode B.

I claim:—

1. In apparatus for the detection and estimation of impurities and dissolved matter in water and other fluid, in combination a fluid container, a tube of transparent electrically insulating material arranged as a dividing wall in a part of the fluid container so as to separate the liquid into two zones which communicate with one another, a sheath electrode on the outside of said tube, a disc electrode movably mounted within said tube, a temperature scale on the transparent tube, a thermometer and means for moving said disc electrode relative to said scale so as to vary the length of the electrical path through the liquid to produce uniform conductance at a selected temperature.

2. In apparatus for the detection and estimation of impurities and dissolved matter in water and other fluids, in combination a fluid container, a tube of transparent electrically insulating material arranged as a dividing wall in a part of the fluid container so as to separate the liquid into two zones which communicate with one another, a sheath electrode on the outside of said tube, an electrode movably mounted within said tube, a temperature scale on the transparent tube, an indicator associated with said electrode for indicating the position of said electrode relative to said scale, a thermometer and means for moving the electrode relative to said scale so as to vary the length of the electrical path through the liquid to produce uniform conductance at a selected temperature.

3. In apparatus for the detection and estimation of impurities and dissolved matter in water and other fluids, in combination a fluid container, a tube of transparent electrically insulating material arranged as a dividing wall in a part of the fluid container so as to separate the liquid into two zones which communicate with one another, a sheath electrode on the outside of said tube, an electrode movably mounted within said tube, a temperature scale on the transparent tube, an indicator associated with said electrode for indicating the position of said electrode relative to said scale, a thermometer and an external cap for said fluid container, said cap supporting the electrodes, the temperature scale, the dividing wall and the electrode operating means so as to form a single unit which can be readily dissociated from the fluid container without disturbing the calibration of the apparatus.

4. In apparatus for the detection and estimation of impurities and dissolved matter in water and other fluids, in combination a fluid container, a tube of transparent electrically insulating material arranged as a dividing wall in a part of the fluid container so as to separate the liquid into two zones which communicate with one another, a sheath electrode on the outside of said tube, a disc electrode movably mounted within said tube, a temperature scale on the transparent tube, a thermometer, means for moving said disc electrode relative to said scale so as to vary the length of the electrical path through the liquid to produce uniform conductance at a selected temperature and an external cap for the fluid container, said cap supporting the electrodes, the temperature scale, the dividing wall and the electrode operating means so as to form a single unit which can be readily dissociated from the fluid container without disturbing the calibration.

CHARLES EDWIN PERRY.